United States Patent [19]

Hauser

[11] 4,310,021

[45] Jan. 12, 1982

[54] CONTROL VALVE

[75] Inventor: Fred Hauser, Los Angeles, Calif.

[73] Assignee: Hydro-Rain Inc., Laguna Niguel, Calif.

[21] Appl. No.: 250,399

[22] Filed: Apr. 2, 1981

[51] Int. Cl.³ .............................................. F16K 31/52
[52] U.S. Cl. .................... 137/624.2; 137/635; 137/627
[58] Field of Search ........... 137/624.2, 624.18, 624.19, 137/624.17, 624.15, 624.11, 627, 635; 251/89; 239/66, 70

[56] References Cited

U.S. PATENT DOCUMENTS

| | | | |
|---|---|---|---|
| 2,837,118 | 6/1958 | Allen | 137/624.17 X |
| 3,286,733 | 11/1966 | Hunter | 137/624.2 |
| 3,425,446 | 2/1969 | McNown | 137/624.2 X |
| 3,783,899 | 2/1974 | Fowler | 137/635 X |

Primary Examiner—Alan Cohan
Attorney, Agent, or Firm—Gordon L. Peterson

[57] ABSTRACT

A control valve for irrigation and other purposes comprising an actuator mounted for rotation along a path, a motor for moving the actuator along the path, and first and second pilot valves located at first and second stations, respectively, along the path. As the actuator moves along the path, it sequentially engages the pilot valves and holds them in a first position. An adjustable selector is provided at each of the stations for controlling the length of time that the actuator holds the associated pilot valve in the first position to thereby control each of the pilot valves. The pilot valves are used to control main valves.

10 Claims, 5 Drawing Figures

CONTROL VALVE

BACKGROUND OF THE INVENTION

Valve control systems are used to operate one or more valves. For example, an irrigation system may comprise several circuits with the water flow through each of the circuits being controlled by a separate main valve.

In the valve control system control shown in my U.S. Pat. No. 2,252,125, a wiper or actuator rotates through a series of stations and operates a pilot valve at each of these stations. The pilot valves operate main valves, which control water flow through the various circuits of the irrigation system.

A similar valve control system, which provides for adjusting the length of time of watering at each circuit, is shown in my U.S. Pat. No. 2,372,324. The concept of variable timing for each of the irrigation circuits is most desirable. However, in my U.S. Pat. No. 2,372,324, the variable timing is obtained through the use of a stacked series of timing cams which can be selectively raised into operative engagement with a cam for operating the pilot valves. This construction is relatively complex and inflexible in that it requires one timing cam for each timing program, a mechanism to move the timing cams, and specially constructed service valves. This prior art system also cannot provide infinite asjustability in the timing at each station.

SUMMARY OF THE INVENTION

This invention generally overcomes the disadvantages of the prior art noted above by providing a control valve which relatively simply and inexpensively provides for variable timing at a multiplicity of stations. With this invention, the multiple timing discs of the prior art are eliminated, and the timing at each station can be varied by manually adjusting an individual selector. The control valve of this invention can be used to control one or more valves, and although it is particularly adapted for irrigation purposes, its use is not limited to irrigation.

The control valve may include a supporting structure, an actuator mounted on the supporting structure for movement along a path, a motor for moving the actuator along the path, and one or more valves adjacent the path. Each of these valves may be a pilot valve which in turn controls a main valve, such as a main valve of the type which controls water flow through an associated circuit of the irrigation system. Although the actuator can move along paths of different configuration, for simplicity, the actuator is preferably mounted for rotation so that it moves along a circular path.

The actuator can be driven by various different kinds of motors which will move the actuator at a constant velocity. In a preferred construction, the motor is a spring clock motor, the force of which may be augmented, if desired, by a secondary spring. When a spring clock motor is used, it is turned manually to wind the spring when it is desired to initiate a cycle of operation, such as a cycle of irrigation.

One or more of the valves which are to be operated by the actuator are located along the path. Each of the valves has an operating member that projects into the path for engagement by the actuator when the actuator moves along an adjacent segment of the path.

By engaging the operating member of the valve, the actuator holds the operating member in a first position and thereby places the valve in a predetermined state, e.g., open, closed, etc. Variable timing is accomplished by controlling the length of time that the actuator engages the operating member of the valve to hold it in the first position.

A movable selector is provided on the supporting structure adjacent each of the valves. Cooperating means is provided on the selector and the actuator, which is responsive to the position of the selector, for displacing the actuator generally laterally of the path so that the actuator does not hold the operating member in the first position. This frees the operating member for movement to a second position as the actuator moves along at least a portion of the path. Thus, by laterally displacing the actuator and by controlling the length of time that the actuator is so displaced, the operating time of the valve is controlled. Each of the selectors cooperates with the actuator in the same manner to provide control for the associated valve.

The cooperating means can be arranged to provide for holding the valve open or closed for all or any portion of the cycle. The cooperating means can provide stepwise control or infinitely adjustable timing control.

The cooperating means can advantageously include cam means on the selector and a cooperating surface on the actuator to selectively vary, as a function of selector position, the portion of the path during which the actuator holds the operating member in the first position. For example, for stepwise control, the cooperating surface of the actuator may be arranged with steps or shoulders to permit the operator to select a defined period during which the valve will be open or closed. To permit progressive adjustment of the timing, the periphery of the actuator can be curved and cooperate with a curved cam on the selector.

The invention, together with further features and advantages thereof, may best be understood by reference to the following description taken in connection with the accompanying illustrative drawing.

DESCRIPTION OF THE PREFERRED EMBODIMENT

Figure 1:
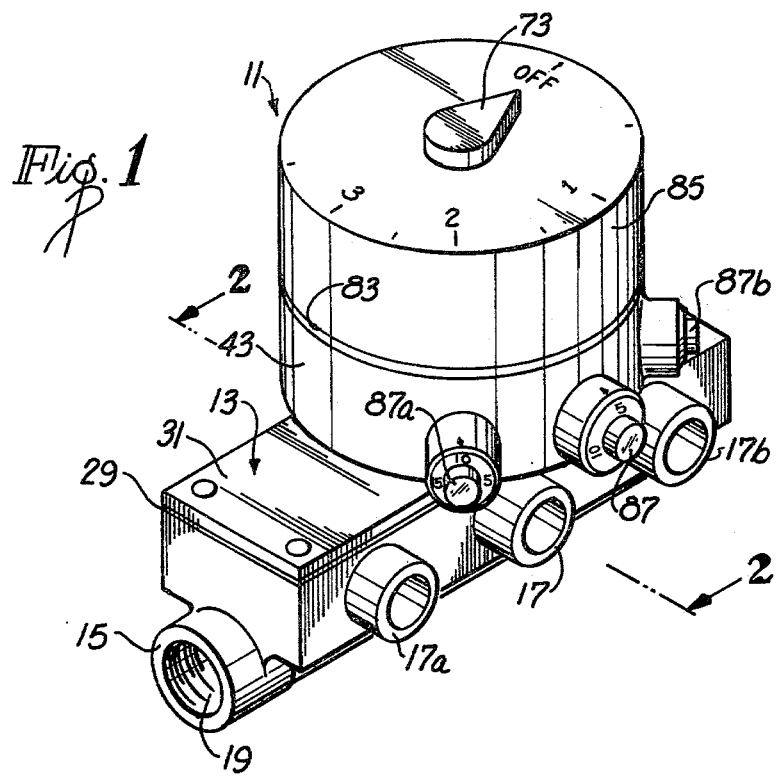
FIG. 1 is a perspective view of a control valve constructed in accordance with the teachings of this invention.

FIG. 1 shows a control valve 11 of the type used to control the flow of water through several separate circuits for irrigation purposes. The control valve 11 includes a housing 13 of a suitable plastic material having an inlet 15 for connection to a source of water (not shown) and a plurality of outlets 17, 17a and 17b for connection to separate irrigation circuits. Of course, any suitable number of the outlets may be provided, and the three illustrated are merely illustrative.

A manifold passage 19 (FIGS. 1 and 2) provides communication between the inlet 15 and locations adjacent to each of the outlets 17, 17a and 17b. A main valve 21 (FIG. 2) is movable between a closed position shown in FIG. 2 to provide communication between the manifold passage 19 and the outlet 17 and a closed position in which communication between the manifold passage and the outlet 17 is blocked. An identical valve 21 is provided for each of the outlets 17a and 17b. Although the valve 21 may be of various different constructions, in the embodiment illustrated, it includes an annular valve seat 23 at the free end of a tubular riser 24 and movable valve element 27. The riser 24 is molded integrally with a lower housing section 25, and the movable valve element 27 comprises a diaphragm 29 sandwiched between the housing section 25 and a cover plate 31 and a valve disc 33 affixed to the diaphragm. The disc 33 is movable into sealing engagement with the valve seat 23 to block communication between the manifold passage 19 and the outlet 17. A spring 34 urges the valve element 27 toward the closed position.

The opening and closing of the main valve 21 is controlled by a pilot valve 35, and the main valves for the other outlets 17a and 17b are controlled by identical pilot valves 35a and 35b (FIG. 3), respectively. The diaphragm 29 and the cover plate 31 define a chamber 37 above the diaphragm. The cover plate 31 has a passage 39 leading from the chamber 37 to the pilot valve 35, and similar passages (not shown) in the cover plate provide communication between the other associated main valves and pilot valves. A pressure passage 41 provides communication from the manifold passage 19 to the pilot valve 35. The other pilot valves similarly communicate with their associated main valves and with the manifold 19.

The housing 13 includes a tubular section 43 suitable mounted on the cover plate 31. A resilient sealing gasket 45 (FIG. 2) is sandwiched between the tubular section 43 and the cover plate 31.

The pilot valve 35 is mounted on the lower wall of the tubular section 43 (FIGS. 2 and 4) and includes a threaded body 47 threadedly received within a boss 48 on the tubular secton 43, a valve element 49, an operating member 51 coupled to the valve element and projecting axially through a central bore 50 of the body 47, a valve seat 53 at the lower end of the body 47, a valve seat 55 formed on the lower wall of the tubular section 43 and a coil compression spring 57 normally biasing the valve element 49 into sealing engagement with the valve seat 53. The valve element 49 is provided in a chamber 54, and the passages 39 and 41 open into this chamber, with the valve seat 55 surrounding the pressure passage 41. The operating member 51 projects upwardly above the top surface of the body 47.

Figure 2:
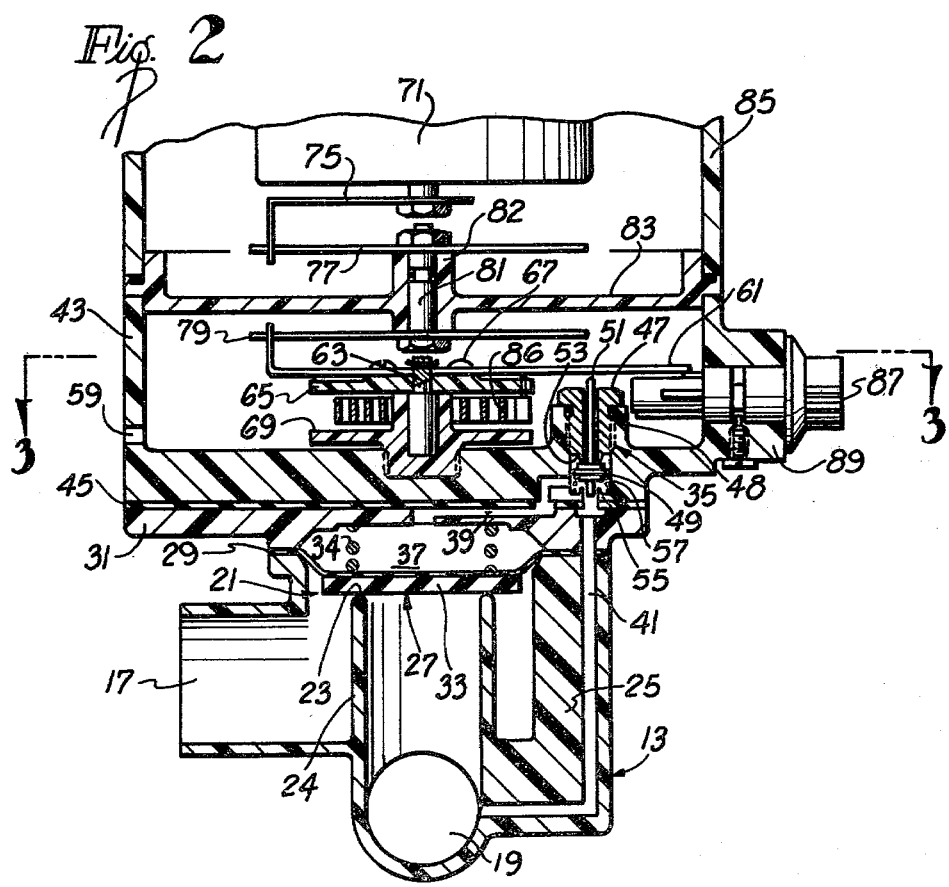
FIG. 2 is a fragmentary sectional view taken generally along line 2—2 of FIG. 1 showing one of the main valves closed.

With the spring 57 urging the valve element 49 into sealing engagement with the valve seat 53, water at supply pressure can pass from the pressure passage 41 through the chamber 54 and the passage 39 into the chamber 37. The fluid pressure in the chamber 37 and the spring 34 urge the valve element 27 into sealing engagement with the valve seat 23 as shown in FIG. 2 due to the differential area of the valve element 27. Conversely, to open the valve, it is only necessary to move the valve element 49 downwardly off of the seat 53 and into engagement with the valve seat 55 to thereby vent the chamber 37 through the passage 39, the clearance space in the bore 50 around the operating member 51 and an opening 59 in the side wall of the lower tubular section 43. This allows fluid at supply pressure from the manifold passage 19 to lift the valve element 27 off the valve seat 23. The pilot valves 35a and 35b function in an identical manner to control the opening and closing of the associated main valves.

The pilot valves 35, 35a and 35b can be controlled by controlling the position of their operating members 51a and 51b. With this invention, the operating members are controlled by an actuator 61 (FIGS. 2-4) which is mounted for rotational movement along a circular path on a stationary shaft 63. In the embodiment illustrated, the actuator 61 is resilient and is constructed of a resilient metal. Although the actuator 61 can be mounted in different ways, in the embodiment illustrated, it is mounted on a disc 65 by screws 67 (FIGS. 2 and 3) and the disc 65 is rotatably mounted on the shaft 63. A retaining ring 68 holds the actuator 61 and the disc 65 on the shaft 63. The shaft 63 is mounted within, and held against rotation by, a mounting block 69 which is threadedly mounted on the bottom wall of the tubular housing section 43.

Although the actuator 61 can be driven in many different ways, it is preferred to use a conventional spring clock motor 71 of the type which includes a knob 73 (FIG. 1) for winding the motor and a driving arm 75 (FIG. 2) for providing the output motion from the motor. Clock motors of this type are described in my U.S. Pat. Nos. 2,252,125; 2,311,108; and 2,372,324.

Although various drive trains can be utilized to cause the driving arm 75 to rotate the actuator 61, in the embodiment illustrated, this is accomplished by arms 77 and 79 (FIG. 2) which are drivingly coupled to a rotatable shaft 81 and which are drivingly coupled, respectively, to the driving arm 75 and the actuator 61. The shaft 81 is rotatably mounted in a bearing 82 formed integrally with a plate 83 which is clamped between the tubular section 43 and an upper housing section 85.

Figure 3:
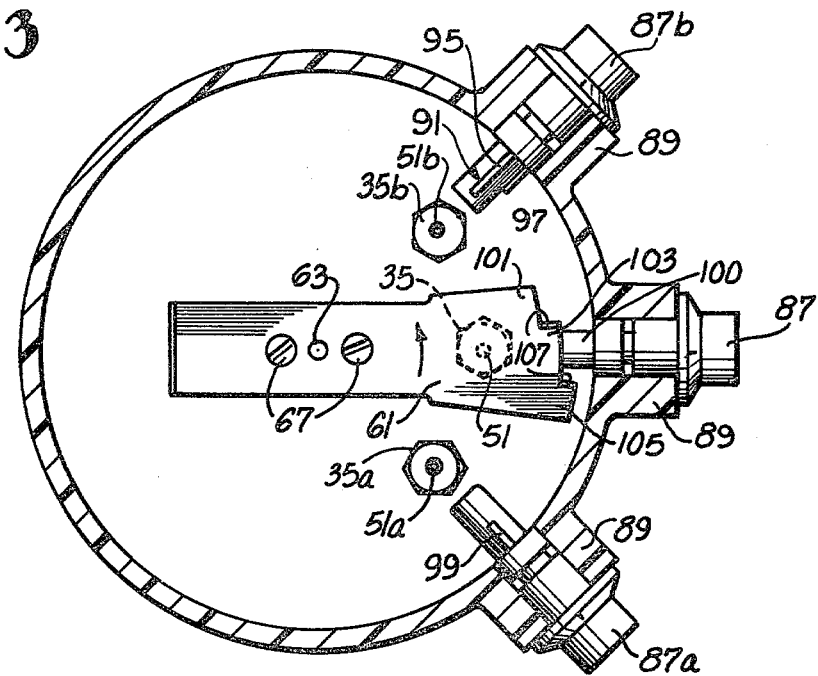
FIG. 3 is a sectional view taken generally along line 3—3 of FIG. 2.

Fully winding the clock motor 71 to move the knob 73 to position 3 (FIG. 1) moves the actuator 61 clockwise as viewed in FIG. 3 to an initial position which is approximately at the 6 o'clock position in FIG. 3. Alternatively, the clock motor 71 can be partially wound to provide irrigation via one or two of the stations by turning the knob 73 to position 1 or 2, respectively. Winding of the clock motor winds the spring of the clock motor, and in addition winds or tensions a spring 86 on the mounting block 69. The spring 86 augments the driving force of the clock motor 71 and its use is optional. Opposite ends of the spring 86 are attached to the disc 65 and the mounting block 69.

Figure 4:
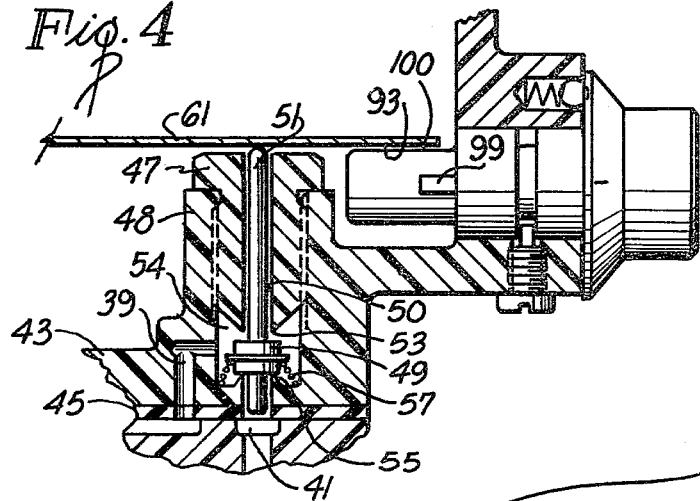
FIG. 4 is an enlarged fragmentary sectional view of a portion of FIG. 3 illustrating the actuator engaging the operating member of the valve to open the associated main valve.

As the actuator 61 is driven along its circular path by the motor 71 and the spring 86, it sequentially engages the upper end of each of the operating members 51a, 51 and 51b. When the actuator 61 engages the operating member 51, it moves the valve element 49 downwardly into engagement with the seat 55 as shown in FIG. 4 to bring about opening of the associated main valve 21. However, the actuator 61 can be resiliently displaced laterally of its path to a location in which the actuator cannot hold the operating member 51 in the downward position and, accordingly, the spring 55 can move the operating member to the upper position shown in FIG. 2 to bring about closure of the main valve 21.

This displacement of the actuator 61 is brought about by identical selectors 87, 87a and 87b, which are provided for the pilot valves 35, 35a and 35b, respectively.

As shown in FIG. 3, each of the selectors 87, 87a and 87b is rotatably mounted in an associated boss 89 molded integrally with the lower tubular section 43. The pilot valves 35, 35a and 35b are located at circumferentially spaced stations around the shaft 63, and the selectors 87, 87a and 87b are positioned adjacent their associated pilot valves for cooperating with the actuator 61.

Cams means 91 is provided on each of the selectors 87, 87a and 87b and a cooperating surface 93 (FIG. 4) is provided on the actuator 61 for cooperation with the cam means to control the displacement of the actuator. In the embodiment of FIGS. 1–4, the cam means 91 includes three longitudinally extending raised ribs 95, 97 and 99 on each of the selectors (FIGS. 3 and 4) of progressively decreasing length and a location 100 on each of the selectors containing no rib. The ribs 95, 97, and 99 and the location 100 are spaced apart 90°. The actuator 61 has regions 101, 103 and 105 of different radial dimensions which cooperate with the ribs 95, 97 and 99, respectively and which define shoulders 107 between adjacent regions. The rib which is uppermost will lift the actuator 61 upwardly only when the corresponding region 101, 103 and 105 passes over such rib. This closes, or maintains closed, the associated main valve 21. By placing the location 100 uppermost, no lifting of the actuator 61 occurs and the associated main valve is open during the entire cycle. Of course, any number of the ribs and cooperating regions of the actuator can be provided. For example the ribs 95, 97, and 99 on a selector may cause opening of the corresponding main valve 21 for 0, 5, 10 and 15 min., respectively.

In the embodiment illustrated the radial dimensions of the regions 101, 103, and 105 increase in the direction which is opposite the direction of rotation of the actuator 61. However, these radial dimensions could progressively increase in the direction of rotation of the actuator, if desired.

When irrigation is desired, the operator turns the knob 73 to wind the spring of the clock motor 71 and the spring 86. The clock motor 71 and the spring 86 then drive the actuator 61 counterclockwise as viewed in FIG. 3 from about 6 o'clock to about 12 o'clock through a complete cycle of operation. At the outset, each of the main valves 21 is closed because the operating members 51, 51a and 51b are held in the upper position by the associated springs 57. The length of time that irrigation is desired at each of the circuits can be manually selected by appropriately rotating the selectors 87, 87a and 87b.

For example, if at the station associated with the pilot valve 35a, a long irrigation cycle is desired, the selector 87a is rotated to bring the relatively short rib 99 to the uppermost position. The rib 99 is so short radially that the regions 101 and 103 will not contact this rib as the actuator 61 moves counterclockwise through this station. Thus, the actuator 61 depresses the actuating member 51a and the main valve 21 associated with this first selector 87a opens. However, when the radially longer region 105 reaches the rib 99, the latter cams the actuator 61 upwardly against the resilient biasing force of the actuator to thereby free the associated operating member 51a for upward movement to bring about closing of the associated main valve for a time required for the region 105 to traverse the operating member 51a.

As soon as the actuator 61 rotates sufficiently to move the region 105 off of the short rib 99, the portion of the cycle devoted to control of this main valve terminates and the pilot valve 35a closes the associated main valve 21. Essentially simultaneously therewith, a second segment of the path of movement of the actuator 61 is initiated, and this segment is devoted to control of the second pilot valve 35 and the associated main valve 21. The selector 87 for the pilot valve 35 cooperates in the manner described above with the actuator 61 to control the length of time that the main valve 21 associated with the pilot valve 35 is opened. In the position illustrated in FIG. 4, the selector 87 is turned so that the location 100 is uppermost, and consequently the associated main valve 21 is open for the entire segment of time devoted to control of this main valve. Similarly, the actuator 61 cooperates with each successive selector in the same manner such that the length of time that each of the main valves is open is individually controlled.

Figure 5:
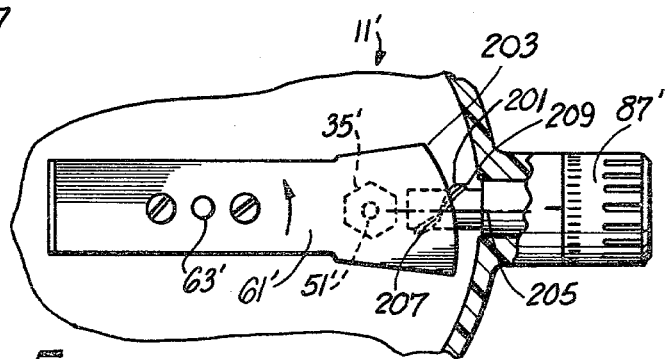
FIG. 5 is a fragmentary plan view similar to a portion of FIG. 3 illustrating an embodiment of the invention which provides for infinitely adjusting the timing.

The control valve 11 of FIGS. 1–4 provides for proportionate or stepwise control of the length of time that each of the main valves 21 is held open. FIG. 5 shows a control valve 11' which provides for infinitely adjusting the length of time that each of the main valves is open. The control valve 11' is identical to the control valve 11 in all respects not shown or described herein and portions of the control valve 11' corresponding to portions of the control valve 11 are designated by corresponding primed reference characters.

In FIG. 5, the cam means on the selector 87' is in the form of a helical cam 201 which projects radially outwardly of the selector 87'. In addition, the actuator 61' has a continuous, curved peripheral edge 203 which provides the actuator 61' with a continuously and progressively increasing radial dimension in a circumferential direction opposite to the direction of rotation of the actuator. Of course, the radial dimension of the actuator 61' could progressively increase in the direction of rotation of the actuator, if desired.

The relationship between the helical cam 201 and the peripheral edge 203 is such that the high point of the cam 201, which lies along reference line 205, can displace the actuator 61a laterally to allow closing of the associated main valve for a length of time which is a function of the rotational position of the selector 87'. The helical cam 201 has an inner end 207 and an outer end 209. In the position of the helical cam 201 shown in FIG. 5, a central region of the cam between the inner end 207 and the outer end 209 is uppermost. Accordingly, as the actuator 61' begins control of the main valve associated with the operating member 51', the actuator holds the operating member in a down position to open the associated main valve in the same manner as described hereinabove with reference to FIGS. 1–4. However, as the actuator 61' continues its counterclockwise movement, the curved peripheral edge 203 ultimately contacts the high point of the cam 201 thereby elevating the actuator 61' for the remainder of the portion of the cycle devoted to control of the operating member 51' and the associated main valve. Accordingly, thereafter, the main valve is closed. To increase the length of time that the main valve is open, the selector 87' can be rotated to make a region nearer the outer end 209 uppermost. Conversely, to reduce the length of time that the main valve is open, the selector 87' can be rotated to make a region of the helical cam 201 adjacent the inner end 207 uppermost.

Although exemplary embodiments of the invention have been shown and described, many changes, modifications and substitutions may be made by one having ordinary skill in the art without necessarily departing from the spirit and scope of this invention.

I claim:

1. A control valve comprising:
an actuator;
means for mounting the actuator for movement along a path;
motor means for moving the actuator along said path;
a valve including an operating member adjacent said path and movable between first and second positions to operate said valve, said actuator being engageable with the operating member as the actuator moves along at least a first segment of said path to hold the operating member in said first position;
a first movable selector; and
first cooperating means on the selector and the actuator and responsive to the position of the selector for displacing the actuator generally laterally of said path to a location in which the actuator does not hold the operating member in the first position whereby the operating member can move to the second position as the actuator moves along at least a portion of said first segment of said path.

2. A control valve as defined in claim 1 wherein the cooperating means is responsive to the selector being in a predetermined position for displacing the actuator generally laterally of said path for one part of said segment of said path and for allowing the actuator to engage the operating member for another part of said segment of said path whereby the position of said operating member can change intermediate the ends of said segment of said path.

3. A control valve as defined in claim 1 wherein said cooperating means is responsive to the position of the selector for infinitely varying the length of said portion of said segment of said path.

4. A control valve as defined in claim 1 wherein said cooperating means includes cam means on the selector and a cooperating surface on the actuator to selectively vary, as a function of selector position, said portion of said segment of the path during which the actuator holds the operating member in the first position.

5. A control valve as defined in claim 4 wherein said selector is rotatable, said cam rotates with said selector, and said cooperating surface includes a peripheral portion of said actuator.

6. A control valve as defined in claim 5 wherein said cooperating surface includes at least one shoulder to permit stepwise adjustment in the length of time that the operating member is held in the first position by the actuator.

7. A control valve as defined in claim 5 wherein said cooperating surface includes a curved edge on said actuator to permit progressive changes in the length of time that the operating member is held in the first position as a function of selector position.

8. A control valve as defined in claims 1 or 4 wherein said valve is a first pilot valve and said controller includes a second pilot valve including an operating member adjacent said path and movable between first and second positions to operate the second pilot valve, said actuator being engageable with the operating member of the second pilot valve as the actuator moves along a second segment of said path to hold the operating member of the second pilot valve in the first position thereof, a second movable selector, second cooperable means on the second selector and the actuator and responsive to the position of the second selector for displacing the actuator generally laterally of said path to a location in which the actuator does not hold the operating member of the second pilot valve in the first position thereof whereby the operating member of the second pilot valve can move to the second position thereof as the actuator member moves along at least a portion of said second segment of said path, and first and second main valves operated, respectively, by said first and second pilot valves.

9. A control valve controller comprising:
a supporting structure;
a resilient actuator;
means for mounting the actuator on the supporting structure for rotational movement along a path;
spring driven motor means for moving the actuator along said path;
first and second pilot valves arranged at first and second stations, respectively, along said path, each of said pilot valves having an operating member adjacent said path and movable between first and second positions to operate the associated pilot valve, said actuator being engageable with the operating members of the first and second pilot valves as the actuator moves along first and second segments, respectively, of said path to hold such operating members in the first position thereof;
first and second movable selectors at said first and second stations, respectively; and
first and second cams on the first and second selectors, respectively, and responsive to the position of the associated selectors for camming the resilient actuator away from the associated operating members as the actuator moves through at least portions of the first and second segments, respectively, of said path to thereby permit each of the selectors to control the length of time that the associated operating member is held in the first position by the actuator.

10. A control valve comprising:
a supporting structure;
an actuator mounted on the supporting structure for movement along a path;
a spring driven motor on the supporting structure for moving the actuator along said path;
an inlet manifold;
a plurality of main valves, each of said main valves having an inlet in communication with said inlet manifold and an outlet;
a plurality of pilot valves for said plurality of main valves, respectively, said pilot valves being on the supporting structure and being responsive to said actuator as said actuator moves along discrete portions of said path, respectively, to sequentially control said main valves;
a plurality of selectors for said plurality of pilot valves, respectively, said selectors being mounted on said supporting structure and being accessible from the exterior of the supporting structure; and
means responsive to each of said selectors for selectively deflecting said actuator as the actuator moves along said path to thereby vary the time interval that the main valves are open.

* * * * *